(12) United States Patent
Philipp

(10) Patent No.: US 7,148,704 B2
(45) Date of Patent: Dec. 12, 2006

(54) CHARGE TRANSFER CAPACITIVE POSITION SENSOR

(76) Inventor: Harald Philipp, 651 Holiday Dr., Bldg. 5/300, Pittsburgh, PA (US) 15220

( * ) Notice: Subject to any disclaimer, the term of this patent is extended or adjusted under 35 U.S.C. 154(b) by 0 days.

(21) Appl. No.: 10/697,133

(22) Filed: Oct. 30, 2003

(65) Prior Publication Data

US 2004/0104826 A1    Jun. 3, 2004

Related U.S. Application Data

(60) Provisional application No. 60/422,837, filed on Oct. 31, 2002.

(51) Int. Cl.
*G01R 27/26* (2006.01)
*G01M 19/00* (2006.01)

(52) U.S. Cl. ............... 324/686; 324/662; 702/86

(58) Field of Classification Search ............. 324/658, 324/659, 660, 661, 662, 663, 665, 676, 678–679; 345/173–178
See application file for complete search history.

(56) References Cited

U.S. PATENT DOCUMENTS

| | | | |
|---|---|---|---|
| 4,158,133 A | 6/1979 | Spaeth et al. | |
| 4,476,463 A | 10/1984 | Ng | |
| 4,581,714 A * | 4/1986 | Reid ............................ | 702/86 |
| 4,622,437 A * | 11/1986 | Bloom et al. ............. | 178/18.05 |
| 5,079,500 A | 1/1992 | Oswald | |
| 5,305,017 A | 4/1994 | Gerpheide | |
| 5,461,319 A | 10/1995 | Peters | |
| 5,730,165 A | 3/1998 | Philipp | |
| 5,812,057 A * | 9/1998 | Hepworth et al. ........... | 340/540 |
| 5,914,465 A * | 6/1999 | Allen et al. .............. | 178/18.06 |
| 5,920,131 A | 7/1999 | Platt et al. | |
| 6,178,818 B1 | 1/2001 | Plochinger | |
| 6,288,707 B1 * | 9/2001 | Philipp ........................ | 345/168 |
| 6,304,091 B1 * | 10/2001 | Shahoian et al. ........... | 324/662 |
| 6,452,514 B1 | 9/2002 | Philipp | |
| 6,457,355 B1 | 10/2002 | Philipp | |
| 6,466,036 B1 * | 10/2002 | Philipp ........................ | 324/678 |
| 6,559,658 B1 * | 5/2003 | Brandt ........................ | 324/681 |
| 2002/0140440 A1 * | 10/2002 | Haase ......................... | 324/678 |

FOREIGN PATENT DOCUMENTS

| | | |
|---|---|---|
| EP | 0 711 978 A2 | 5/1996 |
| EP | 0 877 229 A1 | 11/1998 |
| WO | PCT/GB03/04682 | 10/2003 |

* cited by examiner

*Primary Examiner*—Andrew H. Hirshfeld
*Assistant Examiner*—Jeff Natalini
(74) *Attorney, Agent, or Firm*—David Kiewit

(57) ABSTRACT

The position of an object, which may be a user's finger, along a body is sensed capacitively. A measurement circuit meters the simultaneous injection of electrical charge into the two ends of the body, which may be shaped as a straight line or as a curve. A computing device computes the ratio of the relative changes in the amount of charge injected into each end of the element. The result of this computation is a one dimensional coordinate number plus a detection state indication, both of which can be fed to another functional element, such as an appliance controller, which interprets the coordinate and detection state as a command or measurement.

20 Claims, 11 Drawing Sheets

Switching Sequence of A, A', B, B', C, C' for Figure 2A

1 Close A, A', C, C' (reset Cs1, Cs2)
2 Float all switches
3 Close B, B' (charge Cs1, Cs2)
4 Float all switches
5 Close A, A' (clamp strip to ground)
6 Measure 1, 2
7 goto step 1 (if desired)

Fig. 3A

Switching Sequence of A, A', B, B', C, C' for Figure 2B

1 Reset Counters CT1, CT2
2 Close A, A', C, C' (reset Cs1, Cs2)
3 Float all switches
4 Close B, B' (charge Cs1, Cs2)
5 Float all switches
6 Close A, A' (clamp strip to ground)
7 If (VCs1 < Vt) then increment CT1;
   If (VCs2 < Vt) then increment CT2
8 If ((VCs1 <Vt) or (VCs2 <Vt)) then goto step 3
9 Float all switches
10 goto step 1 to repeat (if desired)

Fig. 3B

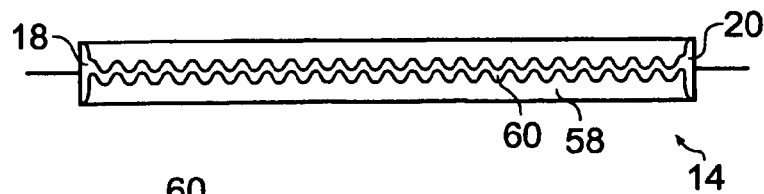
Fig. 5
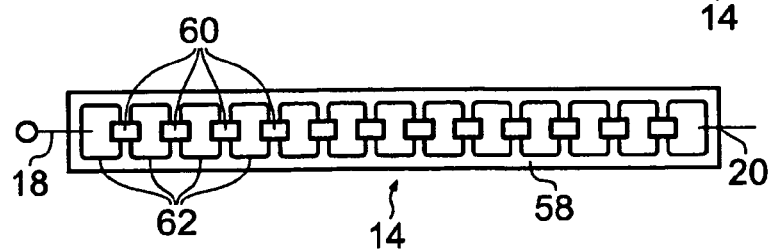
Fig. 6a
Fig. 6b
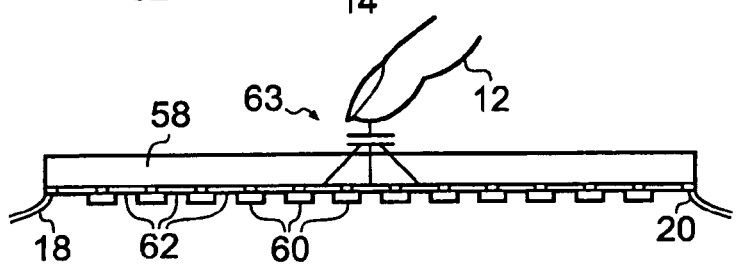
Fig. 7
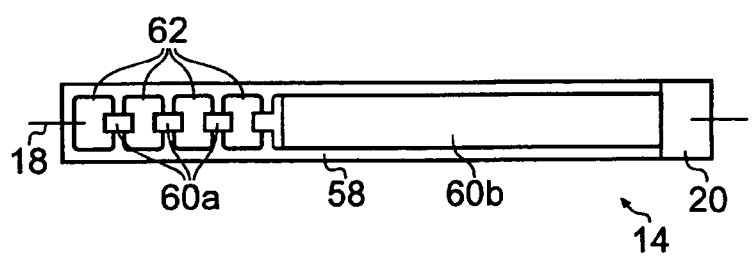
Fig. 9
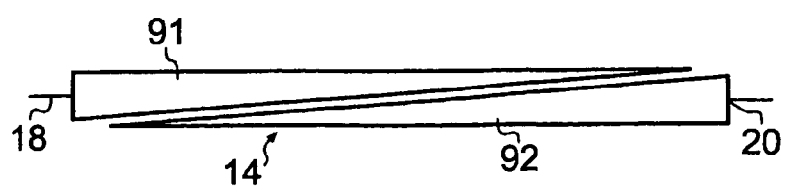
Fig. 15

CHARGE TRANSFER CAPACITIVE POSITION SENSOR

CROSS REFERENCE TO OTHER APPLICATIONS

This application claims the priority of the inventor's U.S. Provisional Application for Patent filed on Oct. 31, 2002 and having Ser. No. 60/422,837.

FIELD OF THE INVENTION

The invention provides apparatus and methods for human interfaces to electronic apparatus as well as for sensing material displacement. More particularly, the invention pertains to capacitive sensing of a position along a line or curve.

BACKGROUND INFORMATION

Capacitive sensors have become increasingly common and accepted for use in human interfaces and for machine control. In the field of home appliances it is now quite common to find capacitive touch controls operable through glass or plastic panels. These sensors are increasingly typified by my U.S. Pat. No. 6,452,514, the disclosure of which is herein incorporated by reference, which describes a matrix sensor approach employing charge-transfer principles.

Due to increasing market demand for capacitive touch controls, there is an increased need for lower cost-per-function as well as greater flexibility in usage and configuration. Similarly, there is a significant demand for capacitive material displacement sensors (e.g. fluid level sensors, mechanical movement sensors, pressure sensors etc.) at lower price points, which cannot be easily met with current generations of non-mechanical transducers.

In many applications there is a need for a human interface having many keys or sensing positions, akin to the flexibility afforded by 2-D touch screens or touch pads, as typified by U.S. Pat. No. 4,476,463 (Ng) or U.S. Pat. No. 5,305,017 (Gerpheide). For example, in a computer monitor, it is desirable to have controls on the screen bezel to allow adjustment of brightness and contrast. Ideally a continuously adjustable control (e.g. a potentiometer) is used to control these parameters. Due to price pressures and aesthetic requirements, these have been usually eliminated in favor of a few bezel-mounted menu selection buttons which are much harder for the user to understand.

In the fields of electronic and medical test instruments, LCD displays are often used in conjunction with rows of bezel buttons to provide software-driven menu functions. Many such applications are incompatible with the expense, reduced contrast, and fragility of touch screens. Moreover, the performance of some of these suffer from deep or limited menu options and visual parallax. An example of this type of menu control is to be found in almost any current cash dispenser such as the LCD-5305 model made by the NCR Corporation of Dayton, Ohio. Manufacturers would use higher resolution controls on or closer to the edge of the screen if economic considerations could be met. Similar markets exist for domestic appliances, educational games, info/internet kiosks, and the like.

In the field of HVAC, the state of the art in wall-mount thermostatic controls is currently exemplified by the Model CT8602 made by the Honeywell Corporation of Morristown N.J. This model is a menu-drive system with a small LCD screen. Advanced features in these devices are accessed via deep levels of menus which are often non-intuitive when compared with simple dial or slider based controls.

Electromechanical human interface controls (such as pushbuttons, membrane switches, and potentiometers) have the noted defects of being unreliable and subject to water ingress, as well as being only marginally compatible with LCD-based menu systems. Classic user controls, such as dials and resistive potentiometers, require panel openings which allow dirt and moisture to enter into the product. They also do not present a 'clean' appearance, are considered increasingly quaint, and seriously limit the flexibility of industrial designers. U.S. Pat. No. 5,920,131 (Platt) describes one solution to this problem in the form of a rotary knob which is magnetically held to a seamless panel surface and which magnetically interacts with position sensing detectors below the panel surface. This solution still requires a knob, is expensive to manufacture, and only works well as a rotary device, although many applications require linear sensing.

There exists a substantial demand for new human interface technologies which can, at the right price, overcome the technical deficits of electromechanical controls on the one hand, and the cost of touch screens or other exotica on the other. It is the intent of the invention to permit a new class of touch sensor which addresses these issues in unison, while providing also the basis for a whole new class of position sensors across a number of industries and applications.

In the field of mechanical displacement sensing LVDTs, exemplified by the Schaevitz (Slough, UK) MP series, exist to provide precision positioning information for feedback in process controls. Other smaller devices such as the Schaevitz XS-B series are incorporated into machines and instruments. Such devices are usually high-cost solutions, albeit very accurate, and rely on magnetic field balance measurements made with expensive signal conditioners. These devices exist to provide highly reliable non-contact sensing and can operate in harsh environments with great precision. They solve the wiper-reliability problem of resistive potentiometric methods by eliminating the use of a physical contact. Similarly, there are capacitive position sensors, as exemplified by the RDP Electrosense Inc. (Pottstown, Pa. U.S.A.) RCDT capacitive transducer, which also requires a special, expensive signal conditioner to operate. An example of such technology is described more fully in U.S. Pat. No. 5,461,319 (Peters) which describes a bridge based circuit. Capacitive based devices can accommodate both linear and rotational position sensing. For example U.S. Pat. No. 5,079,500 (Oswald) describes a linear or rotary 'potentiometer' having a capacitive wiper, which makes for a highly reliable method of position sensing as it does not use a galvanic wiper. Adaptations are available to measure pressure and by inference, fluid level. The above referenced technologies however suffer the problem of being very complex and expensive to manufacture, limiting their use to high-end or industrial equipment.

LVDT and RCDT type transducers work very well, but leave untapped a very large market for low cost devices which can be used commercially in automotive and appliance applications. It is a further intent of the invention to permit the creation of a new class of position sensor, based on capacitance, that does not also require expensive signal conditioning or the need for expensive wound coils or magnets and that is adaptable to either linear or rotary position sensing.

Capacitive fluid sensors which measure capacitance change caused directly by the fluid exist; one example is contained in my U.S. Pat. No. 6,457,355. Other examples abound, such as U.S. Pat. No. 6,178,818.

Existing capacitive fluid sensors are not very popular due to their cost or inability to compensate automatically for changes in dielectric properties. Few are capable of accurately sensing fluid level from outside a plastic or glass vessel. It is a further intent of the invention to provide for a new type of capacitance based fluid sensors that can economically sense the level of contents of a container from inside or outside, without regard to the dielectric properties of the material or fluid being sensed.

In my U.S. Pat. No. 5,730,165, I teach a capacitive field sensor employing a single coupling plate to detect change in capacitance to ground. This apparatus comprises a circuit employing repetitive charge-then-transfer or charge-plus-transfer cycles and preferably uses CMOS switching elements that differ from common integrated CMOS push-pull driver circuitry in that the CMOS elements disclosed in U.S. Pat. No. 5,730,165 have floating terminals. In my subsequent U.S. Pat. No. 6,288,707, I teach the use of this charge transfer technology for sensing position in one and two dimensions. The disclosure of U.S. Pat. Nos. 5,730,165 and 6,288,707 are herein incorporated by reference.

In my U.S. Pat. No. 6,466,036 "Charge Transfer Capacitive Measurement Circuit", the disclosure of which is herein incorporated by reference, I teach another capacitive field sensor employing a single coupling plate to detect change in capacitance to ground. This apparatus comprises a circuit employing repetitive charge-then-transfer or charge-plus-transfer cycles and, significantly, uses common integrated CMOS push-pull driver circuitry in which one terminal of every switch is connected either to a reference voltage or to a circuit ground. The disclosure of U.S. Pat. No. 6,466,036 is herein incorporated by reference.

SUMMARY OF THE INVENTION

Generally speaking, the invention provides a capacitive sensor having a position output that varies linearly with a point or spot measured along a sensing body, such as a resistive or conductive body, extending between two electrodes at which a sensed object is touching or most nearly proximate. This sensor comprises two capacitive measurement channels, each of which is connected to a respective one of the electrodes. When the channels are operated in synchrony, each channel has a non-linear response (an exponential rise in the main embodiment) to a capacitive load imposed by the object when the object is proximate the body, and deliver respective outputs that are linearly combined to provide a position output that varies linearly with the position, thereby operating as a ratiometric sensor. The combination may be formed using analog or digital circuitry, in programmable logic or software, for example.

A preferred embodiment of the invention comprises a sensing element and a circuit designed to provide a one-dimensional readout of the location of an object or finger capacitively coupled to the element. In this case the circuit measures the simultaneous injection of electrical charge into the two ends of the element. A computing device computes the ratio of the relative changes in the amount of charge injected into each end of the element. The result of this computation is a one dimensional coordinate number plus a detection state indication, both of which can be fed to another functional element, such as an appliance controller, which interprets the coordinate and detection state as a command or measurement.

One aspect of the invention is that it provides a capacitive sensor for sensing a position of an object along a sensing body extending between two electrodes. This sensor comprises two voltage sources for supplying two different selected voltages to switching elements respectively associated with each of two sensing channels respectively connected to the two electrodes. Each of the sensing channels comprises a respective sample capacitor having two terminals, one of which is connected to a respective electrode by means not comprising an electric switching element. In addition, each channel comprises three electric switching elements, each of which has both a single respective closed state in which it connects one of the terminals of the respective sample capacitor uniquely to one of the two sources of selected voltage, and a respective open state in which it does not connect the respective one of the terminals to either of the two sources of selected voltages. A respective voltage measurement circuit is associated with each channel in order to supply a voltage output responsive to a voltage measured at a selected one of the terminals of the respective sample capacitor. In addition, there is a switch controller for selectively opening and closing the switching elements, and means for calculating the position of the object from the respective outputs of the two voltage measurement circuits.

Another aspect of the invention is that it provides a capacitive sensor for sensing a position of an object along a curve having two end points. In this case the sensor comprises a resistive sensing strip extending between two electrodes respectively connected adjacent the two end points. It also comprises a switch controller for selectively closing ones of a plurality of electric switching elements; two sensing channels, each connected to a respective electrode and having a respective output from a respective voltage measurement circuit; and a means, which may be a microprocessor, microcontroller, or other digital calculation circuit for calculating the position of the object from respective outputs of the two voltage measurement circuits. Each of the two sensing channels described in the preceding sentence preferably comprises a respective sample capacitor having two terminals, one of the respective two terminals being connected to a respective electrode by means not comprising any one of the electric switching elements; at least one respective electric switching element for resetting the respective sample capacitor by connecting both of its terminals to a selected one of the two lines; and at least two additional respective switching elements for alternately switching one of the two terminals to the first line and the second of the two terminals to the second line.

Another aspect of the invention is that it provides a method for measuring a position of an object along a sensing body extending between two electrodes, where each of the two electrodes is connected to a respective capacitive measurement channel, each of which comprises a respective sample capacitor having a first of its two terminals connected to a respective one of the two electrodes and its respective second terminal connected to a respective voltage measurement circuit having a respective output. This method has iterative and single pass variations, both of which preferably begin by simultaneously resetting each of the sample capacitors to a respective selected initial state, where the most commonly selected initial state resets both of each sample capacitor's plates either to a ground potential or to a DC reference voltage level. After the two sample capacitors have been reset, a respective first switch associated with each of the channels is closed to connect the respective second of the two terminals of each sample capacitor to a first selected voltage. After waiting a selected interval, both of the first switches are opened and respective second switches are closed to connect each of the respective first terminals of the respective sample capacitors to a respective second selected voltage. The method then calls for simultaneously measuring a respective voltage at the respective first terminal of the respective sample capacitor by means of the respective voltage measurement circuit, and then calculating the position of the object from the outputs of the two voltage measurement circuits.

Yet another aspect of the invention is that it provides a method for measuring a position of an object along a sensing body extending between two electrodes, each of which is connected to a respective capacitive measurement channel and each of which comprises a respective sample capacitor having a first of its two terminals connected to a respective one of the two electrodes, as described in the preceding paragraph. In this case, however, the first terminal of each sample capacitor is also connected to a respective voltage measurement circuit having a respective output. As in the preceding discussion, each iteration of this method begins by resetting each of the sample capacitors to a respective selected initial state and then simultaneously closing respective first switches to connect the respective first of the two terminals of each sample capacitor to a first selected voltage. After waiting a selected interval both of the first switches are opened and respective second switches are closed to connect each of the respective second terminals of the respective sample capacitors to a second selected voltage. The respective voltage measurement circuit is then used to simultaneously measure, for both channels, a respective voltage at the respective first terminal of the respective sample capacitor, and the outputs of the two voltage measurement circuits are used to calculate the position of the object.

In some embodiments of the invention, the sensing element is a rectangular or arcuate resistive strip made of a more or less homogeneous material. Connections are made to electrodes at each end of the strip for connection to a circuit comprised of signal acquisition and signal processing means. The strip is normally disposed on an insulating substrate, and is wide and long enough to accommodate user's fingers or other desired targets for detection purposes. The sense field propagates through the substrate so that the side of the substrate distal from the resistive strip can be used as the active sensing surface. In some other embodiments of the invention, the strip comprises a plurality of discrete resistors electrically connected in series between the electrodes, so as to form individual sensing locations. A minimal configuration for a sensor of this sort would have two resistors in the strip and three sensing areas—one at each end, and one at the junction of the two discrete resistors.

In a modification of this second embodiment, the discrete conductive electrodes are of sufficiently small size and the insulating substrate is thick enough to permit field blending, which effectively "smoothes" the sensed position of the pointing object on the sensing side of the substrate.

It is an object of some embodiments of the invention to provide a one-dimensional readout of the location of an object adjacent or abutting the strip, wherein the location of the object results in a change in capacitance along the strip.

It is a further object of some embodiments of the invention to provide a coded output indicative of the computed position of an object as well as providing a signal indicative of the detection of sufficient signal to validate the coded output. It is yet a further object of some embodiments of the invention to interpret the coded output as a user's selection of one or more discrete touch buttons.

It is an additional object of some embodiments of the invention to provide a one-dimensional reading of an amount of material displacement, e.g. fluid level or piston extension, along the strip. This increases the distributed capacitance along the strip as more of the strip is covered.

Although it is believed that the foregoing recital of features and advantages may be of use to one who is skilled in the art and who wishes to learn how to practice the invention, it will be recognized that the foregoing recital is not intended to list all of the features and advantages, Moreover, it may be noted that various embodiments of the invention may provide various combinations of the hereinbefore recited features and advantages of the invention, and that less than all of the recited features and advantages may be provided by some embodiments.

DESCRIPTION OF THE DRAWINGS

FIG. 3a is a chart depicting switching sequences for the circuit of FIGS. 2a.

FIG. 3b is a chart depicting switching sequences for the circuit of FIGS. 2b.

FIG. 5 is a schematic depiction of a sensing strip made of electrically resistive material deposited in a zigzag pattern to increase linear resistance.

FIG. 6a is a schematic plan view of a sensing strip made from a series string of discrete resistors FIG. 6b is a side view of the sensing strip of FIG. 6a.

FIG. 7 is a schematic depiction of a sensing strip made from a combination of a strip resistor and a string of discrete resistors.

FIG. 8b is a graphical depiction of a correlation of fluid level with the output of the sensor of FIG. 8a.

FIG. 9 is a schematic depiction of a linear transducer based on the use of a strip sensor adjacent a movable piston which acts as a 'wiper'.

FIG. 15 is a depiction of an alternative sensing strip.

DETAILED DESCRIPTION

In studying this Detailed Description, the reader may be aided by noting definitions of certain words and phrases used throughout this patent document. Wherever those definitions are provided, those of ordinary skill in the art should understand that in many, if not most instances, such definitions apply to prior, as well as future uses of such defined words and phrases. At the outset of this Description, one may note that the terms "include" and "comprise," as well as derivatives thereof, mean inclusion without limitation; the term "or," is inclusive, meaning and/or; "resistive body" may stand for a sensing strip used in a capacitive mode and made of a galvanically conductive substance; the words "finger" or "sensed object" stand for an actual human finger, any other bodily appendage or for any mechanical object capable of being sensed proximate the element; the word "touch" stands for physical proximity or for contact by a finger to the element of the invention even if there is a dielectric situated between the element and the finger, where the dielectric may comprise any combination of solids, liquids, gases, or free space; and the word "ground" stands for a circuit reference potential or a field ground forming an impedance loop back to a circuit reference, where it is recognized that ground is not necessarily galvanic in nature.

In general, a sensor of the invention 10 operates as a ratiometric sensor in a manner analogous to active-IR based optical triangulation sensors commonly used for distance measurement in still cameras. An example of such as sensor is the Type S1352 made by the Hamamatsu Corporation of Japan. A similar device is described in U.S. Pat. No. 4,761, 546, to Ikari. In sensors of these types, two outputs are provided from ends of a linear photodiode and the outputs are processed so that when the total combined signal level exceeds a threshold value, a ratio of the outputs is taken to determine the location of the optical spot on the photodiode. The ratiometric result is independent of the intensity of the light spot, while its certainty improves with signal strength and signal integration time.

Figure 1:
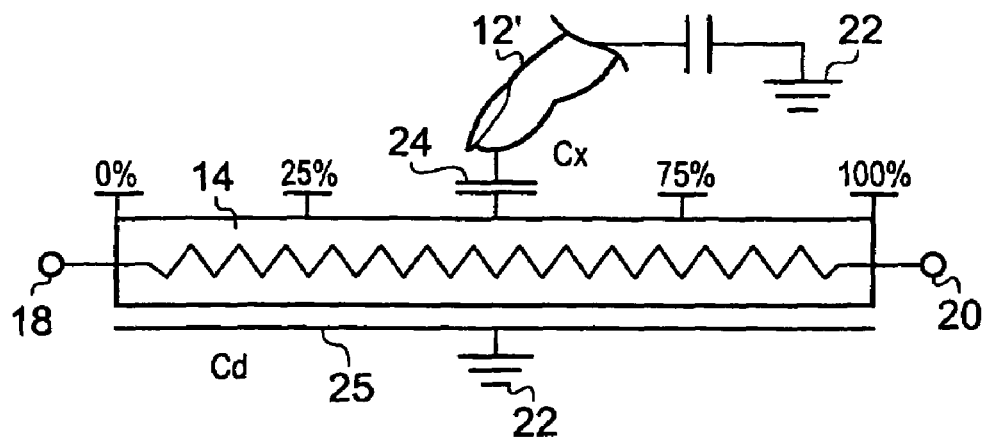
FIG. 1 is a schematic depiction of a sensing strip made of an electrically resistive sheet or deposited resistive material showing both distributed capacitance as well as touch point capacitance.

FIG. 1 shows a preferred sensing arrangement in which a user's finger, stylus, or other sensed object 12 used for a pointing function is brought adjacent a resistive sensing strip 14 which may be bonded to a control surface. The sensing strip may be composed of a sheet resistor having a selected resistance per unit length and having two end terminations or electrodes 18, 20. The object 12, which is generally coupled to an earth ground 22, is also coupled to the sensing strip 14 by a spot capacitance 24 (generally hereinafter referred to as Cx). As will be discussed subsequently herein, the proximity-related spot capacitance Cx, which is the capacitive load imposed by the sensed object at a spot or point along the sensing strip, is the electrical parameter of principal interest to the measurement. The sensing strip 14 is also coupled to ground by a distributed capacitance 25 (generally hereinafter referred to as Cd) to its surroundings. The resistive body or sensing strip 14 can be made of any resistive material including carbon film, metal films, indium-tin-oxide (ITO) or SnO, conductive plastics, screen deposited conductors, sputtered conductors etc. without limitation as to material or method of deposition so long as the result is a resistive strip, rod, line, arc, or other suitable shape in one, two, or three dimensions. Several specific arrangements for the sensing strip will be subsequently hereinafter discussed, with particular reference to FIGS. 5–9 of the drawing. The stray capacitance Cd does not need to be linearly distributed, because a preferred strip functions equally well with 'lumpy' capacitances by virtue of the principle of superposition.

Figure 2C:
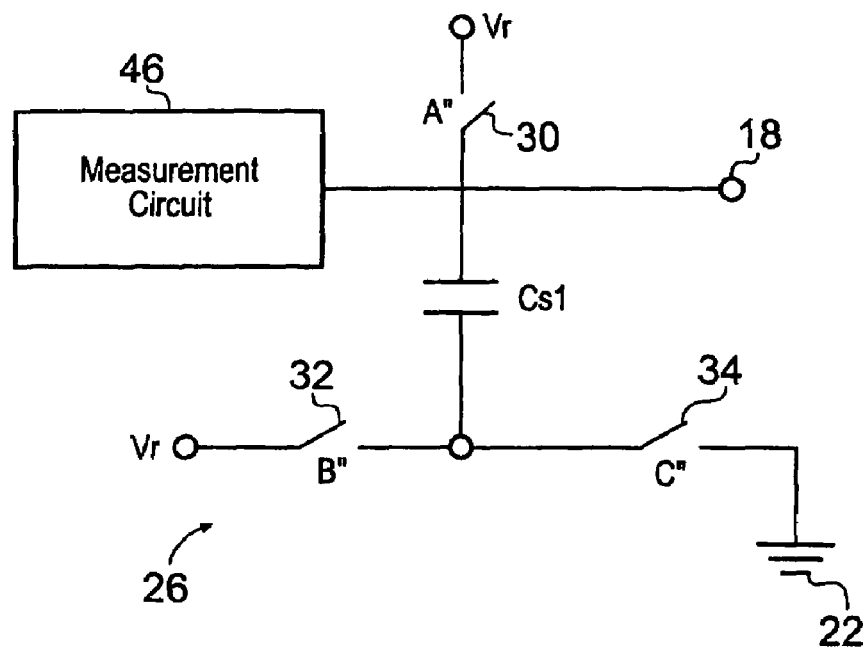
FIG. 2c is a schematic circuit diagram of another embodiment of a switching arrangement usable with the signal acquisition circuitry of FIGS. 2a and 2b.
Figure 2A:
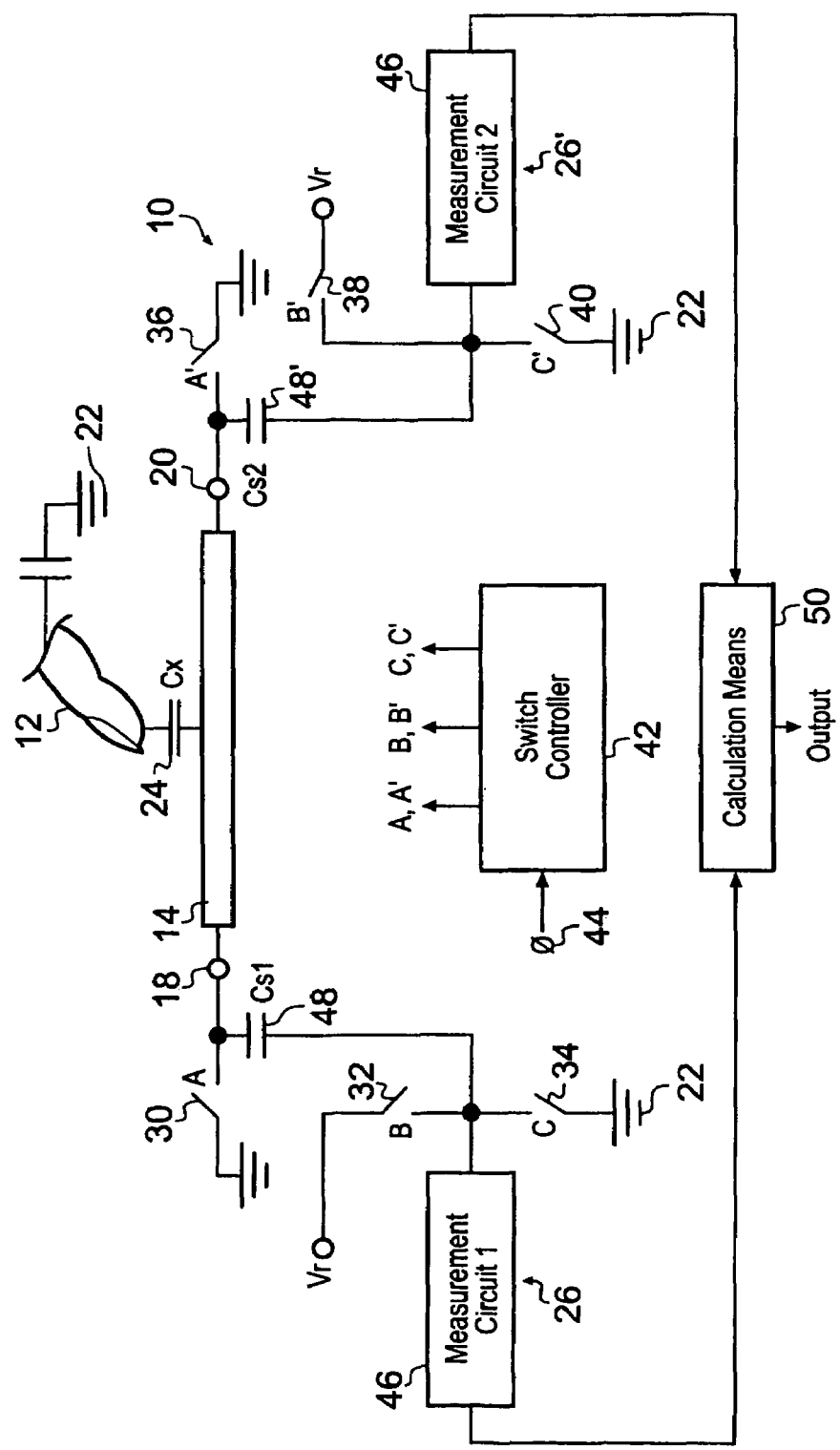
FIGS. 2a and 2b are schematic circuit diagrams showing respective preferred embodiments of control and signal acquisition circuitry.
Figure 2B:
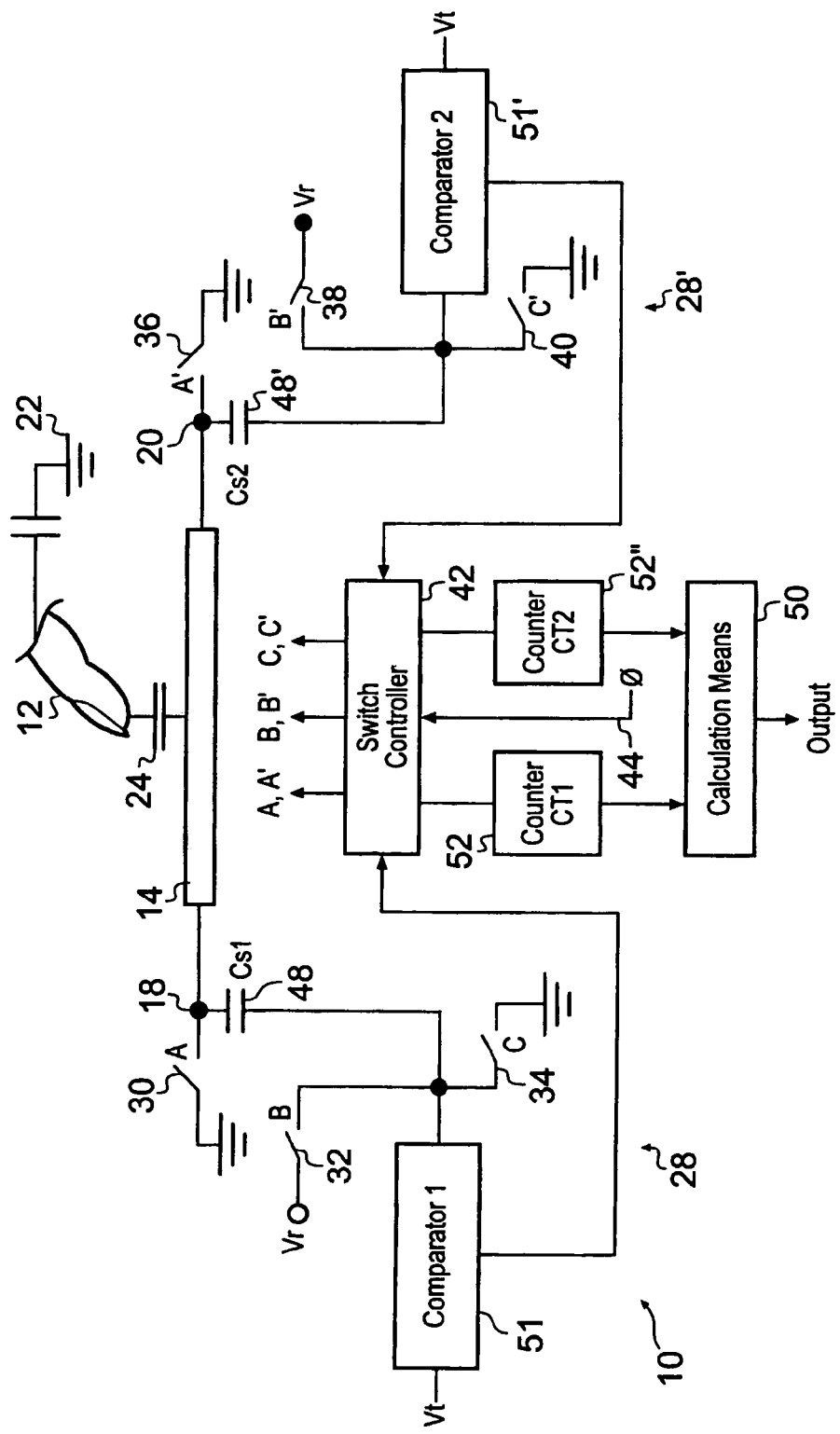

Turning now to FIGS. 2a and 2b, one finds two preferred measurement arrangements connected to the sensing strip 14 via electrodes 18 and 20. In each of these depictions, the circuitry comprises two channels 26, 26' and 28, 28', respectively. Each preferred channel comprises a respective switching circuit of the type first disclosed in my U.S. Pat. No. 6,466,036, in which each of a plurality of switching elements 30, 32, 34, 36, 38, 40 is 'rail-referenced' in that it has one of its two terminals directly electrically connected to one of the selected reference voltages indicated as Vr and a circuit ground 22. The specific embodiments discussed in detail hereinafter may be understood with particular reference to FIG. 7 of U.S. Pat. No. 6,466,036, although other rail referenced arrangements can be used, and include those generated by interchanging the ground and Vr symbols in FIGS. 2a and 2b of the instant invention. Yet another relevant channel topology is the one depicted in FIG. 2c, which is equivalent to that shown in FIG. 9 of U.S. Pat. No. 6,466,036. In the exemplar cases described hereinafter the channels operate either for a selected interval (e.g., FIG. 2a) or until a selected amount of charge has been transferred (e.g., FIG. 2b). Those skilled in the art who are familiar with the teachings of my earlier patents will recognize that there are other possible choices for channel operation. The two sensing channels 26, 26', 28, 28' are operated synchronously so that the two respective sets of switches 30, 32, 34 (generally hereinafter referred to as A, B, and C, respectively) and 36, 38, 40 (generally hereinafter referred to as A' B' C', respectively) operate in a substantially simultaneous manner. The sequence of switching is shown in FIGS. 3a and 3b for the circuits of FIGS. 2a and 2b, respectively, where the switching functions are controlled by an appropriate switch controller 42 that functions responsive to a clock input 44, shown in the drawing with the symbol Φ.

In FIG. 2a, the measurement circuits 46, 46' preferably comprise respective analog-to-digital converters (ADC), although the same functionality can be provided by a single ADC that is time multiplexed between the two channels 26, 26'. In either arrangement, the ADC values are taken at the end of a burst of charge-transfer cycles of fixed duration. In operating this arrangement, the controller 42 simultaneously manipulates the switches as shown in FIG. 3a; and the channel results are found after the voltage on the two channel sample capacitors 48, 48' (generally hereinafter referred to as Cs1 and Cs2, respectively) is measured in step 6. These results are combined in a suitable calculation means 50, which may be a microprocessor, to provide an output representative of the position of the pointing object.

In the arrangement depicted in FIG. 2b, the controller simultaneously manipulates the switches as shown in FIG. 3b. After each switching cycle, comparators 51, 51' are used to compare the voltages on the respective channel sample capacitors Cs1, Cs2 with a selected comparison voltage Vt. When either of the sample capacitors attains the comparison voltage, the number of cycles of charge-transfer required to attain that voltage for the respective capacitor is stored in the counter 52, 52' associated with the respective capacitor. These values are subsequently passed to a suitable calculation means 50 to provide an output representative of the position of the pointing object.

The durations required for the switch closures and openings are usually measured in nanoseconds or microseconds, although the steps involving resetting the sampling capacitors may be in the millisecond range. The actual or optimal timings depend on the choice of specific component values, which include, but are not limited to the sampling capacitor value, switch resistance, and the sensing strip resistance. For example, a strip of very low resistance, such as 10 KOhm, would require switch closure durations of 100 ns or less to prevent significant cross-bleed of charge from Cs1 to Cs2 or vice versa back through the resistive strip itself.

During an initial phase of sensor operation, at power-up for example, calibration readings can be taken of the baseline or background signals from both channels in order to obtain reference readings during a time at which no object 12 is presumed to be present near the sensing strip. These readings may be taken using the same switching sequences described above. The background signals may be asymmetric, and may consist of charge accumulated from anisotropic or 'lumpy' capacitances located along the length of the strip. These signals, as long as they remain constant, may be removed from subsequent samples by subtraction or other arithmetic compensation. Once a calibration is taken, only differential readings from each channel need to be processed in order to calculate the position of the object along the sensing strip. Moreover, slow changes in the background level of signals can be compensated for by using 'drift compensation' methods that slowly adjust the 'reference' levels in a slew-rate limited manner during intervals of non-detection.

To compute the position of an object using the circuit of FIG. 2b the two sensor readings are processed by the calculation means 50 according to the following steps, where the real time acquired signals are Sig1 and Sig2, and the baseline reference levels are Ref1 and Ref2 respectively:

1) Compute the delta signals $\Delta$Sig1, $\Delta$Sig2

$\Delta$Sig1=Ref1−Sig1

$\Delta$Sig2=Ref2−Sig2

2) Compute the ratio indicative of position:

P=$\Delta$Sig2/($\Delta$Sig1+$\Delta$Sig2), where the value P is referenced from the first end 18 of the strip and is has a value between zero and one.

Note that in using a circuit of the sort shown in FIG. 2b the real-time signals Sig1 and Sig2 are always less than the reference values because the counters count fewer times as the spot capacitance on the strip increases. This factors into the polarity of the above result and explains why the equations for $\Delta$Sig are based on (Ref−Sig) instead of (Sig−Ref).

For the detection of objects having a variable distance from the strip, the signal processing is performed only when the total incremental signal strength ($\Delta$Sig1+$\Delta$Sig2) rises above a stored minimum threshold value. This object detection process should preferably incorporate hysteresis and filtering to improve onset detection characteristics.

The signal results of the FIG. 2a circuit are processed in a very similar fashion except that the above equations for $\Delta$Sig are based on (Sig−Ref), because the signals are presumed to rise positively with increasing capacitance from the reference levels. In either circuit, an important consideration is the unsigned magnitude of the value P. Those skilled in the art will recognize that there are other simple mathematical approaches to obtain this value.

Further processing of the result can include:
segmenting a result to fall into a specific location 'bin' for the purpose of defining key regions (as in FIG. 12);
signal filtering of P to reduce position noise; or
'lift off' detection, whereby the removal of the object and subsequent loss of signal is detected and processed so as to permit storage in a memory of the last contacted position.

Figure 4:
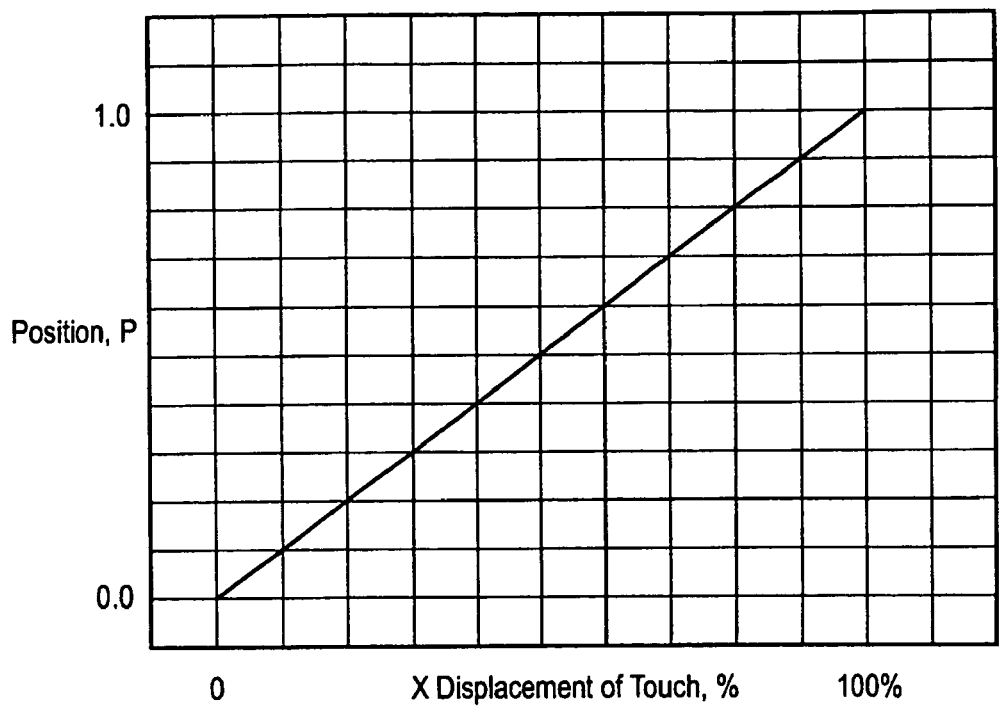
FIG. 4 is a graph of the ratiometric result of contact or proximity along the axis of the sensing strip of FIG. 1, where the percentage displacements in the two figures are correlated.

The value of P is remarkably free of effects of object size or distance. Accuracy to within 2% has been readily demonstrated with common components. Detection through air as a medium has also been demonstrated, permitting the creation of new forms of human and material position sensing. The linearity and range of P with displacement is expressed in FIG. 4. This demonstrated linearity is somewhat surprising when viewed from the perspective of one who has used circuits equivalent to any one of the channels 26, 26', 28, 28' for proximity detection and who is thereby accustomed to seeing a highly non-linear (e.g., an inverse exponential) response of such a circuit to object proximity. It may be further noted that although preferred embodiments of the invention use two identical sample capacitors in the two measurement channels, the sensor output remains linear, although the response curve is offset from that shown in FIG. 4 if the two sample capacitors have different capacitance values.

Figure 2D:
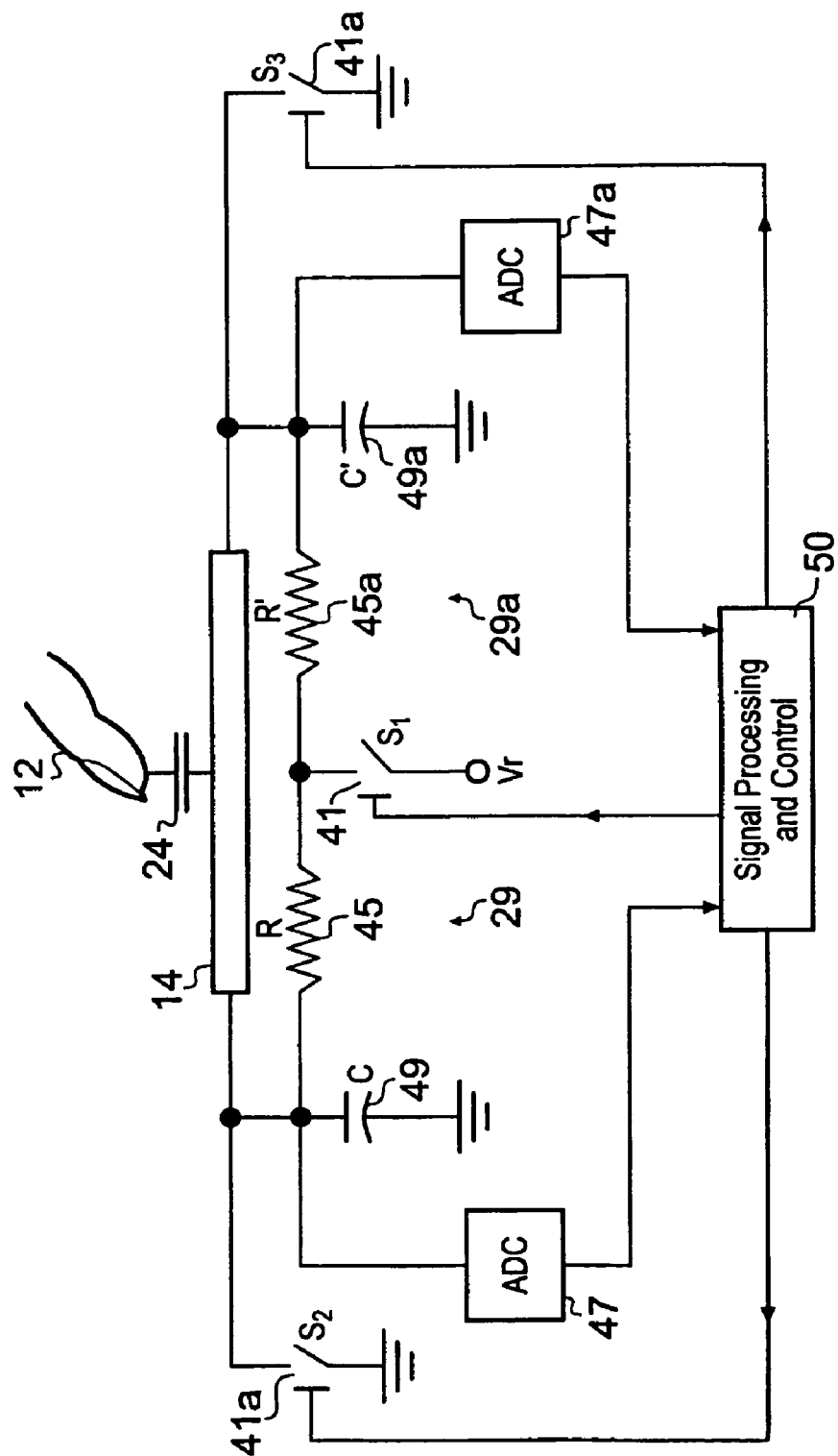
FIG. 2d is a schematic circuit diagram of a resistor-capacitor network used in position sensing apparatus of the invention.

Although preferred embodiments of the invention use the inventor's previously disclosed charge transfer approach to measuring capacitances, it is also possible to configure a position sensor having a linear position output derived from non-linear outputs of two other sorts of capacitive measurement channels having matched topology in order to permit synchronous operation. For example, a single resistor-capacitor (RC) network has a similar inverse exponential output. Two RC channels can be used to measure a change in capacitance arising from the proximity of an object 12 to a spot along the sensing strip 14 by measuring changes in the time constants of the two simultaneously operated RC channels. In the depiction of FIG. 2d, for example, a controller 50 initially controls two reset switches 41a to perform a reset step, which may comprise connecting both terminals of the sensing strip to ground. Subsequently, the controller operates another switch 41 to connect two RC channels 29, 29a, comprising respective sample resistor-capacitor pairs 45, 49 and 45a, 49a, to a voltage source and to then measure the voltage rise at each of the two capacitors 49, 49a by means of respective analog-to-digital circuits 47, 47a for providing respective digital measurement outputs to the controller.

The detection of multiple objects or touches along the strip 14 results in a one-dimensional 'centroid' of P. In a simple case of two touches of equal signal strength at each point, the value P will reflect the midpoint of the two touches. If one touch is of greater capacitance, the value P will be skewed in the direction of the larger capacitance point. In the case of a single extended object such as a finger, the value of P will accurately reflect the center of finger contact. These effects are made possible by the phenomenon of superposition.

Many different choices are available for the configuration of the sensing strip. FIG. 5, for example, shows a strip 14 comprising a zigzag pattern of resistive material 60 disposed on an insulating substrate 58. This arrangement is chosen to increase the strip resistance to a usable level, while maintaining a triangular wave shape that provides a linear response to a proximate object. As noted previously, a low strip resistance will cause significant cross-bleed of charge from Cs1 to Cs2 and vice versa, which will attenuate the resulting ratio result P. Some materials, notably indium-tin oxide (ITO), are hard to process to yield a high resistance, and as a result an etched or deposited pattern of increased trace length and restricted trace width may be used to achieve suitable results.

The sensing strip 14 may also be constructed according to a lumped model as shown in FIGS. 6a and 6b, where a plurality of discrete resistors 60 are connected in series by a corresponding set of discrete metallic interconnecting electrodes 62. This is operationally similar to what one would find with a homogeneous strip, but the displacement representation of a lumped version is more granular for obvious reasons. The granularity can, of course, be minimized by minimizing the distance between adjacent ones of the discrete resistors 60 in the series string. If the sensing strip 14 is made using surface mount technology, for example, adjacent resistors overlap each intervening metallization pad 62 and can be placed with only a narrow gap between them.

This has the advantage of allowing the strip to be constructed from common components, such as discrete resistors, using conventional fabrication methods. Although it would appear that the response of this type of strip would be 'lumpy', in fact if the conductive pads 62 are just smaller than a fingertip (or a mechanical 'wiper') the result is smoothed due to what is effectively an interpolated coupling between neighboring pads as depicted by the multiply connected capacitor 63 in FIG. 6. It has been demonstrated that interconnecting metallizations at 5 mm intervals result in very smooth action with no perceptible cogging, given a substrate 58 thickness that is comparable to the electrode spacing. The dielectric panel acts to help 'blend' the fields from adjacent electrodes and thus to provide desirable smoothness.

In some cases extreme lumpiness is satisfactory, for example when it is desirous to create discrete 'keys'. An arrangement of this sort is depicted in FIG. 7 where a plurality of small, widely separated resistors 60a, shown on the left side of FIG. 7, are combined with a large homogenous strip 60b to provide discrete keys combined with a 'slider' area. An arrangement of this sort could be used, for example, on a PC monitor control bezel where there are discrete control buttons as well as a continuously variable brightness control. In practice there can be any mixture of slider areas and discrete keys in such a configuration, and these may be distributed in any selected sequence. There can also be mixtures of lumpy discrete areas as in FIG. 7, or smooth discrete areas as in FIGS. 5, 6a and 6b, all according to the wishes of the designer.

Figure 8A:
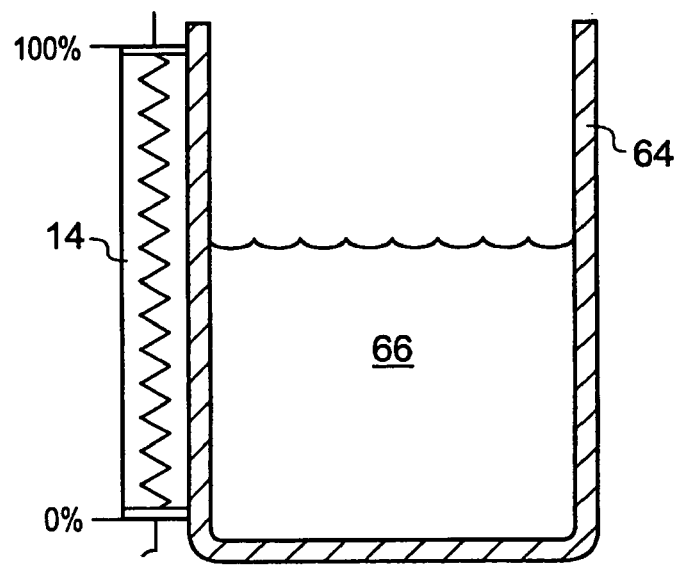
FIG. 8a is a schematic depiction of a resistive sensing strip used as a fluid level sensor.
Figure 8B:
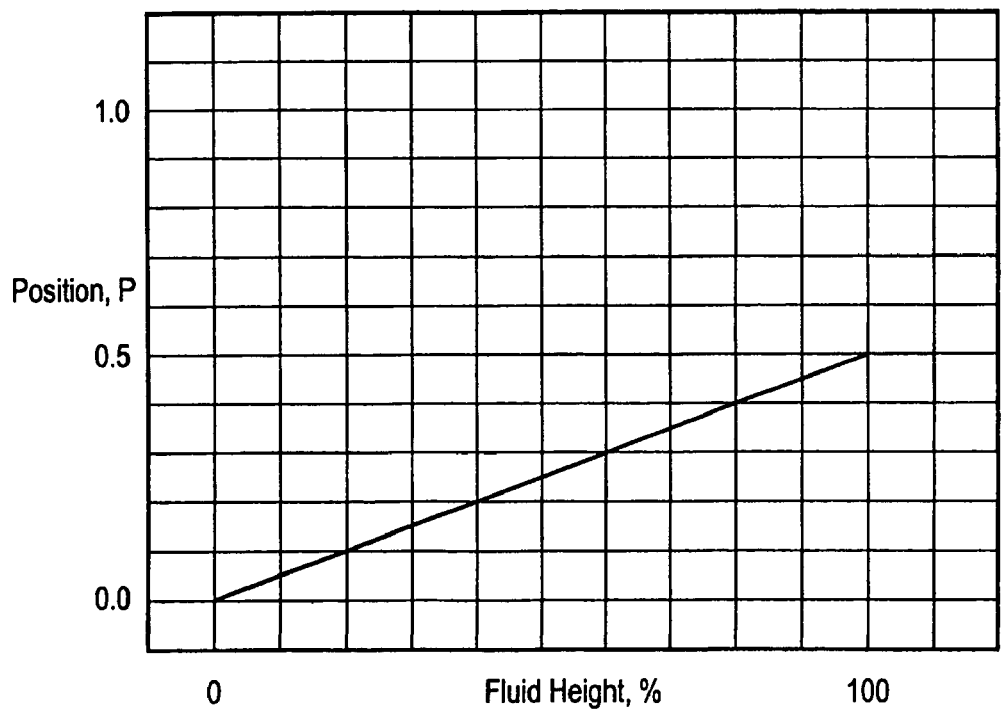

It is also possible to use a strip 14 as a fluid level sensor as depicted in FIGS. 8a, 8b. If the container 64 is empty, there will be no detection of delta signals (from the references) and the result will be P=0 (allowing for an algorithmic override due to failure to meet the minimum signal requirement). If, on the other hand, the container 64 is full of fluid 66, the value P will be 0.5 because the capacitance is increased uniformly across from the entire strip, and the average of this effect is 50%. Lesser amounts of fluid will result in values ranging from just above 0 to just under 0.5. Fluid level sensors can be fabricated as external tank sensors or internal 'dip stick' sensors as required.

Figure 10A:
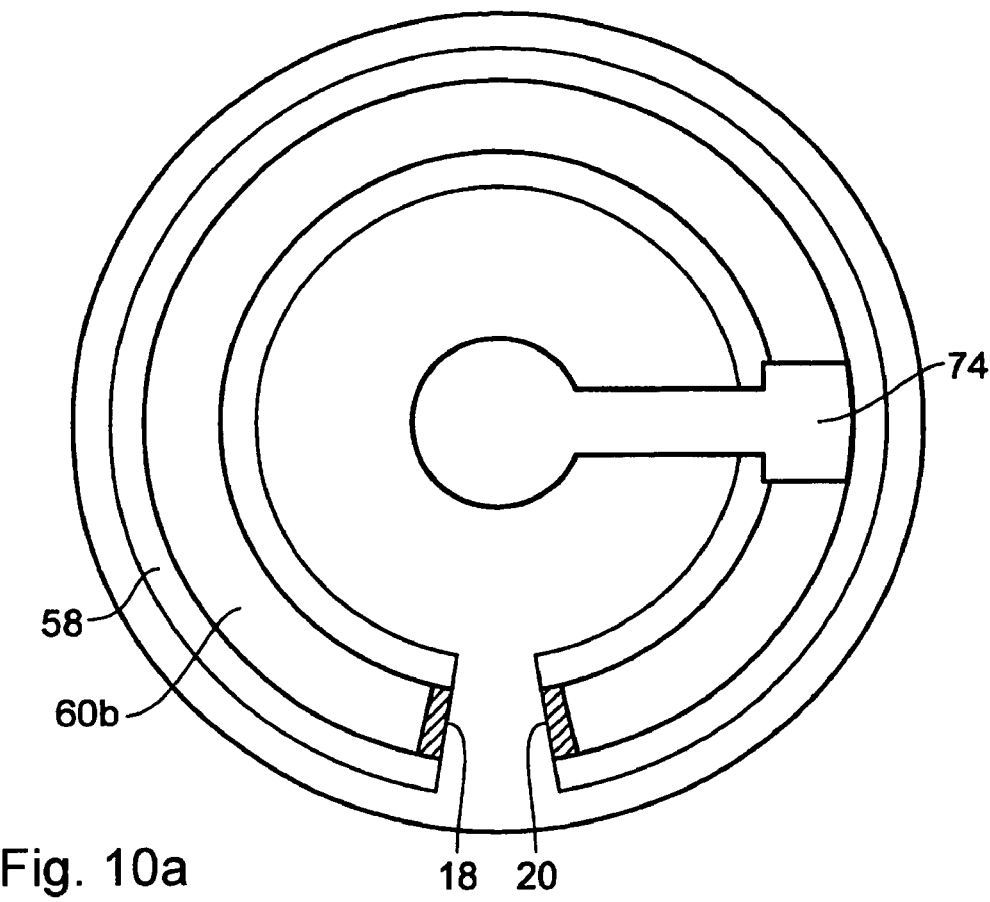
FIGS. 10a and 10b are respectively a schematic plan view and a schematic vertical cross sectional view of a rotary transducer based on the use of a fixed circular resistive element in combination with an adjacent rotary non-contact 'wiper'.
Figure 10B:
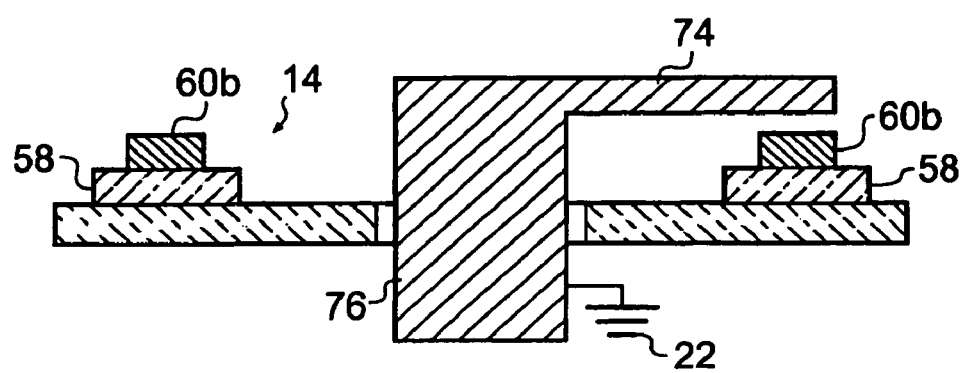

In the case of a piston-type sensor 70, as shown in FIG. 9, the object to be detected is a piston 72 that is preferably spaced apart from the sensing surface. In a rotary sensor, the object to be detected might be a rotary 'wiper' 74, as in FIG. 10a, connected to ground 22 via a shaft 76.

Figure 11:
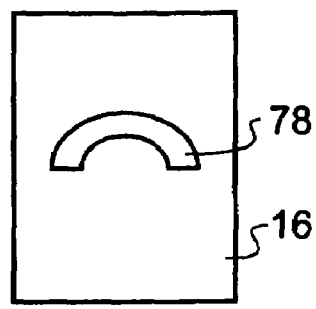
FIG. 11 is a schematic depiction of a wall lighting dimmer control having an arcuate user control graphic element.

A wall lighting dimmer or an appliance control can be constructed as shown in FIG. 11, where the control surface describes an arc, perhaps associated with a bar graph indicator such as a series of LEDs or a segmented LCD display. A suitable graphic element 78 may be used to show the location of touch on the panel surface 16.

Figure 12:
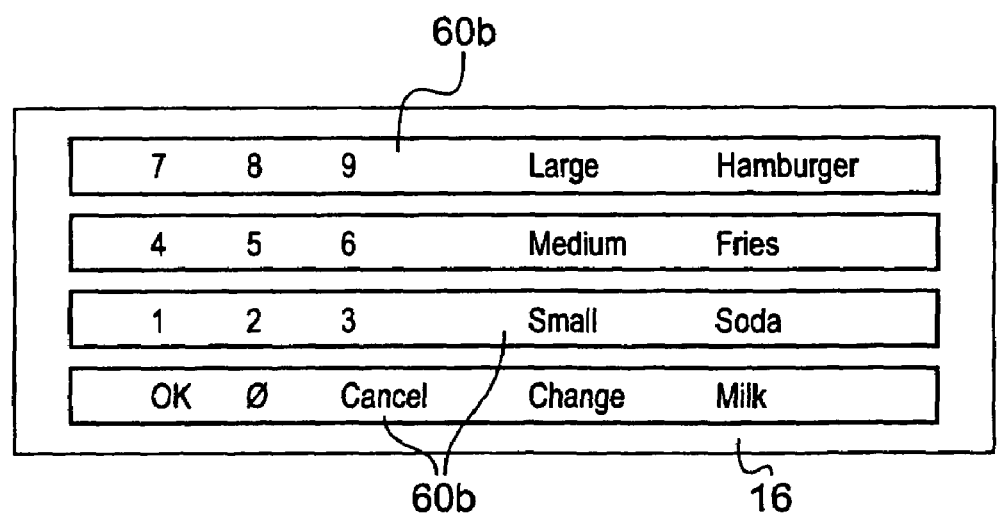
FIG. 12 is a depiction of a flat-panel display having substantially clear, horizontal capacitive sensing strips located over an LCD display.

An LCD or other type of graphic display can have a series of clear ITO resistive strips 60b disposed on a control surface 16, as depicted in FIG. 12. This can provide a very low cost 'touch screen' with limited vertical resolution. The output of the sensing strips can be processed to provide outputs representative of discrete keys, even if the sensing strip is a continuous one (or a 'lumpy' one as in FIG. 7). Such construction can also be used under a keypad to create a very inexpensive control panel with or without an adjacent display. In the case of a keypad, the conductive strips may be under an opaque panel having indicia printed on an overly so that the panel does not necessarily need to be clear.

Figure 13:
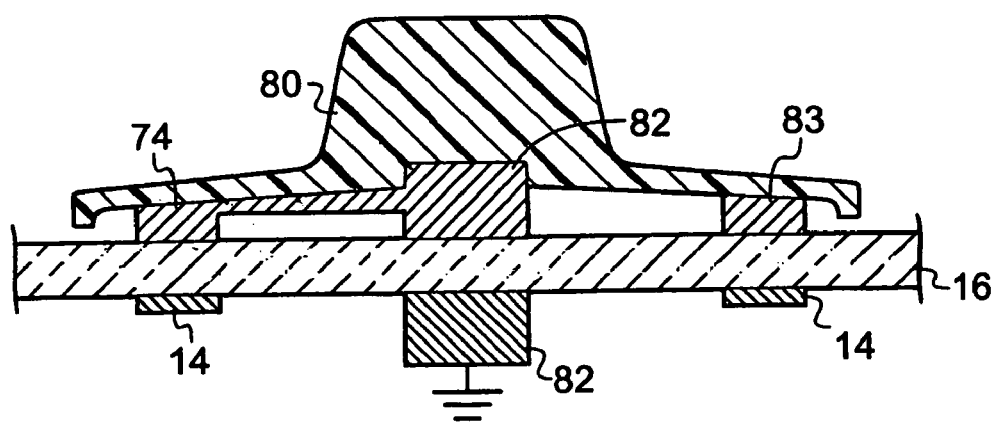
FIG. 13 is a schematic cross sectional view of an embodiment of the invention configured as a control knob.

The invention can also be used to create a 'virtual knob' (FIG. 13) on a control surface where a physical knob 80 is attached to a conductive 'wiper' 74 which operates through a glass or plastic surface 16, thus providing a method of control through a sealed surface to a sensing strip 14. The wiper 74 can act through any dielectric, such as glass or plastic. The knob can be held in place mechanically or with a magnet 82, as is well known from Platt's U.S. Pat. No. 5,920,131, and may comprise a spacer dielectric 83 on the side opposite the wiper. A capacitive return path from the wiper 74 is made preferably via connection to the metal or magnet 82, allowing good coupling back to earth ground inside the control panel using the panel itself as a return capacitor dielectric. Many variations of this scheme are possible, including those having circumference seals against moisture ingress. It is also possible to use the human body as a ground return path upon touch rather than the magnet 82. This allows the sensing electronics to detect an increase in capacitance due to touch, which can be used to create a 'touched signal' in addition to a position signal. A 'touched signal' can be used to inform an appliance control that a human is proximate the knob and that a change is anticipated. For example, the existence of touch can be used to wake a device out of sleep mode, or to turn on indicator LEDs and the like.

Figure 14:
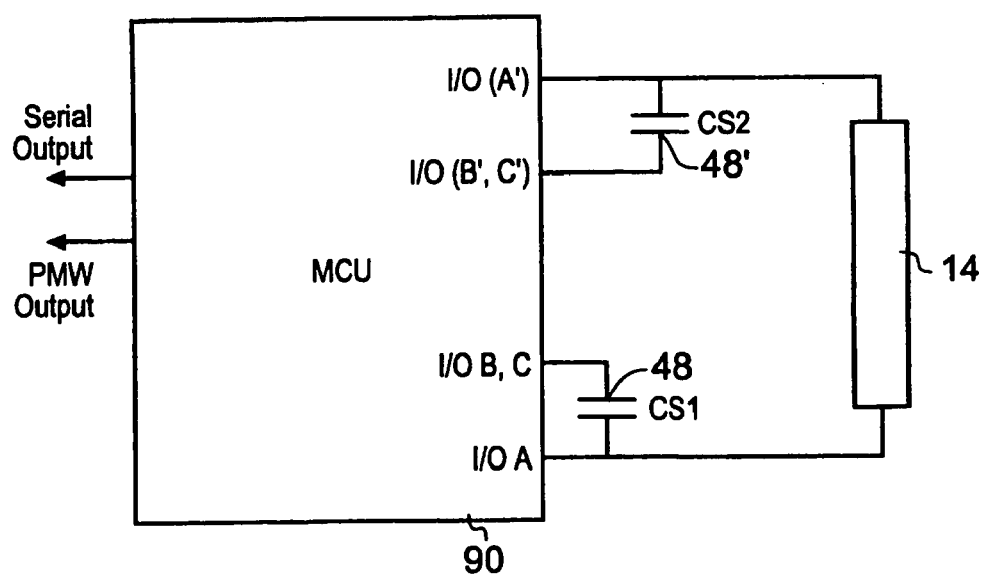
FIG. 14 is a schematic depiction of a microcontroller used with a sensor of the invention.

The entire circuit can be operated using a microcontroller 90, as depicted in FIG. 14. The I/O ports of the microcontroller 90 may be manipulated in a correct sequence, as depicted in FIGS. 3a, 3b. An I/O port pin of a microcontroller typically has at least the three switches necessary to implement the switching sequence under software control. The software can readily implement the functions of circuit elements 42, 50, 51, 51', 52 and 52' of FIG. 2b, as well as the algorithms shown in FIGS. 3a, 3b. The microcontroller should preferably have a push-pull type CMOS pin structure, and an input that can be made to act as a voltage comparator. Most common microcontroller I/O ports are capable of this, as they have a relatively fixed input threshold voltage as well as nearly ideal MOSFET switches. The output of this controller can be either a PWM signal which can be filtered to analog form, or a serial output such as the well known UART, SPI, or I2C formats (or any other type). Such a controller can go on to process a useful function as well, for example to control a triac for light dimming or motor control, in which case the output is highly processed and application specific.

A useful variation of the method is to have a continuous non-linear sensing strip. The 'taper' of the strip can be fashioned to correct mechanical problems or non-linearities by providing a reverse transfer function that linearizes the signal output of the circuit with respect to the mechanics of the system. The use of a logarithmic or other non-linear taper can be used for audio gain control, certain kinds of lighting controls, fluid level sensors, position sensors, and the like, with the objective of resolving displacement more along some areas of the sensing element than others; the reasons for the use of non-linear tapers are commonly known in many application areas and will not be repeated here. The use of resistors as shown in FIG. 6 or 7 can be use to create such non-linear tapers conveniently and cheaply with great accuracy. Such tapers can also be created easily by laser trimming of thick films, or through variable vacuum deposition methods.

The method of switching described herein can be adapted to any of the switching sequences and topologies as described in my U.S. Pat. No. 6,466,036. However the preferred method is that disclosed in FIGS. 2a, 2b, and 3 herein. This particular topology and switching sequence is the most robust against external noise and leakage currents, because the signal sampling is done while the strip itself is connected to ground or to another form of low-Z reference. It can also be understood that other capacitive sensing methods may be employed. However, to achieve an accurate result, it is important that the sensing method performed on the two ends 18, 20 is done substantially in time-synchronization, at least as far as the charge injection is concerned. For example, a sine-wave based circuit could be used and to achieve the correct results both ends 18 and 20 would be driven with similar waveforms substantially in phase with each other. This is one aspect of the instant invention; the driving signals on both ends are substantially the same and in phase. In this way the final result can be made truly ratiometric and thus largely independent of the element's resistance or stray capacitance.

There are many variations possible as will become evident to those skilled in the art involving various combinations of detection methods or switch sequences outlined specifically herein. The method can be combined with methods taught in any number of my prior patents including methods for drift compensation, calibration, moisture suppression using short switch closure times, and the like.

It is possible to adapt the circuitry to use in MEMs, transducers, pressure sensors, moisture detectors, piezoresistive transducers (by looking at variations in resistance uniformity of a sensing element with pressure or flexure while the capacitances Cd are maintained relatively constant), and so on. The material composition and construction method of the element can be of any type whatever. Thick films, conductive inks and paints, vacuum deposited materials, conductive polymers, clear conductors, and even conductive fluids within a bounded volume can be employed as elements. These materials can be deposited, etched, formed, stamped, molded, scribed, plated, or punched in any known manner without limitation. Any such combination of known or knowable material or process in conjunction with the invention should be seen as obvious by practitioners of the art. Likewise, any known type of sensed object can be used, including without limitation, mechanical fingers, rotary wipers, styli, pistons, fluids, circulating balls, appendages of moving equipment or subassemblies, conductive portions of smooth dielectric surfaces, and so on as may be known to be used in conjunction with resistive potentiometers, existing capacitive transducers, LVDT's and the like. Moreover, any human or animal body part can also be used as a sensed object.

FIG. 15 shows an alternative sensing strip 14 which is based on a pair of tapering triangular electrodes 91, 92 extending adjacent to each other separated by a gap. Each electrode is connected to one of the terminations 18, 20 as in the previous embodiments. The sensing strip is thus formed of conductive material, instead of the resistive body used in the above described embodiments. Other geometric forms of the taper can be used. Further details of these kinds of arrangement are given in my earlier U.S. Pat. No. 6,288,707 (see for example FIGS. 4, 5 & 6 and supporting text).

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is claimed is:

1. A capacitive sensor for providing a detection output indicative of proximity to a sensing body extending between two electrodes of an object that is not a portion of the sensor and for providing a position output varying linearly with a position of the object along the sensing body when the object is proximate, thereto, the sensor comprising:
    two capacitive sensing channels, each channel connected to a respective one of the electrodes, each channel having a respective channel output representative of a respective non-linear response to a capacitive load imposed by the object when the object is proximate the body;
    means for operating the two channels synchronously;
    means for summing the respective channel outputs and for providing the detection output if that sum exceeds a selected minimum threshold; and
    calculation means for receiving the respective outputs from the two channels, for calculating a ratio of a selected linear combination of the outputs of the two channels, wherein the ratio varies linearly with the position of the object, and for supplying the ratio as the position output.

2. The sensor of claim 1 wherein the respective output from each of the channels comprises an algebraic difference between a respective first value measured when the object is adjacent the sensing body and a respective second value measured when the object is distal therefrom.

3. The sensor of claim 1 wherein the object is capacitively coupled to an electrical ground.

4. The sensor of claim 1 wherein each sensing channel comprises:
    a respective sample capacitor having two terminals, one of which is connected to the associated electrode by means not comprising an electric switching element;
    three electric switching elements, each of the three switching elements having both a single respective closed state for connecting one of the terminals of the respective sample capacitor to only one of two different reference voltages, each of the respective switching elements further having a respective open state in which it does not connect the respective one of the terminals to either of the two reference voltages; and
    a respective measurement circuit for supplying the respective channel output responsive to a voltage measurement at a selected one of the terminals of the respective sample capacitor.

5. The sensor of claim 1 further comprising a plurality of electric switching elements, wherein each sensing channel comprises:

a respective sample capacitor having two terminals, one of which is connected to a respective electrode by means not comprising one of the electric switching elements;

at least one respective electric switching element of the plurality thereof for resetting the respective sample capacitor by connecting both of its terminals to a first selected reference voltage; and at least two additional respective switching elements of the plurality thereof for alternately switching one of the two terminals of the respective sample capacitor to the first selected reference voltage and the second of the two terminals to a second selected reference voltage.

6. The sensor of claim 1 wherein:

each channel comprises a respective resistor-capacitor pair and means for measuring a parameter change at the associated electrode;

the means for operating the two channels synchronously comprises a controller for controlling at least three electric switching elements; wherein two of the at least three electric switching elements are operable by the controller to simultaneously connect both of the two electrodes to a first reference voltage; and wherein at least a third of the at least three electric switching elements is operable to simultaneously connect a second reference voltage to each resistor-capacitor pair.

7. The sensor of claim 1 wherein each of the channels comprises a sampling capacitor whose voltage rises in an inverse exponential fashion with a capacitive load.

8. The sensor of claim 1 wherein the calculation means comprises a microcontroller and the means for operating the channels synchronously comprises a plurality of switching elements controlled by the microcontroller.

9. The sensor of claim 1 wherein the sensing body comprises two strips of conductive material extending adjacent to each other with a gap therebetween, wherein at least one of the strips tapers along its length.

10. The sensor of claim 1 wherein the sensing body comprises a single resistor.

11. The sensor of claim 1 wherein the sensing body comprises a plurality of discrete resistors connected in series.

12. A capacitive sensor for providing a detection output indicative of proximity of an object and for providing a position output varying linearly with a position of the object along a sensing body extending between two electrodes, the sensor comprising:

two sensing channels respectively connected to the two electrodes, each sensing channel a respective sample capacitor having two terminals, one of which is connected to the associated electrode by means not comprising an electric switching element;

three electric switching elements, each of the three switching elements having both a single respective closed state for connecting one of the terminals of the respective sample capacitor only to one of two different reference voltages, each of the respective switching elements further having a respective open state in which it does not connect the respective one of the terminals to either of the two reference voltages; and a respective measurement circuit for supplying an output responsive to a measurement of a respective capacitive load imposed by the object at a selected one of the terminals of the respective sample capacitor, said output varying non-linearly with the position of the object along the sensing body when the object is proximate the sensing body and the sensor is in operation;

a switch controller for selectively opening and closing the switching elements;

means for summing the respective outputs from the two measurement circuits and for providing the detection output if the sum exceeds a stored minimum threshold value ; and means for calculating the position of the object from a ratio of a selected linear combination of the respective non-linear outputs of the two measurement circuits.

13. The sensor of claim 12 wherein the means for calculating the position of the object comprises a microcontroller.

14. The sensor of claim 12 wherein the sensing body comprises a single resistor.

15. The sensor of claim 12 wherein the sensing body comprises a plurality of discrete resistors connected in series.

16. A capacitive sensor for providing a detection output indicative of proximity of an object and for providing a position output that varies linearly with a position of the object along a sensing body extending between two electrodes, the sensor comprising:

a switch controller for selectively closing ones of a plurality of electric switching elements;

two sensing channels having respective inputs from the electrodes and having respective outputs from respective associated measurement circuits, each of the respective outputs responsive to a capacitive load imposed by the object, each of the respective outputs varying non-linearly with the position of the object along the sensing body when the object is proximate the sensing body and the sensor is in operation, each of the sensing channels comprising a respective sample capacitor having two terminals, one of which is connected to a respective electrode by means not comprising one of the electric switching elements;

at least one respective electric switching element of the plurality thereof for resetting the respective sample capacitor by connecting both of its terminals to a first selected reference voltage;

at least two additional respective switching elements of the plurality thereof for alternately switching one of the two terminals of the respective sample capacitor to the first selected reference voltage and the second of the two terminals to a second selected reference voltage;

means for summing the respective outputs from the two measurement circuits and for providing the detection output if the sum exceeds a selected minimum threshold value; and a means for calculating the position of the object from a ratio of a selected linear combination of the respective non-linear outputs of the two measurement circuits.

17. The sensor of claim 16 wherein the means for calculating the position of the object comprises a microcontroller.

18. The sensor of claim 16 wherein the sensing body comprises two strips of conductive material extending adjacent to each other with a gap therebetween, wherein at least one of the strips tapers along its length.

19. The sensor of claim 16 wherein the sensing body comprises a single resistor.

20. The sensor of claim 16, wherein the sensing body comprises a plurality of discrete resistors connected in series.

* * * * *